United States Patent [19]

Mukae et al.

[11] 4,021,199

[45] May 3, 1977

[54] AUTOMATIC CLEANING APPARATUS FOR ELECTRODES OF pH METER

[75] Inventors: Satoshi Mukae; Kiyosi Yokokawa, both of Shimonoseki, Japan

[73] Assignee: Mitsui Mining & Smelting Co., Ltd., Tokyo, Japan

[22] Filed: July 7, 1975

[21] Appl. No.: 593,296

[30] Foreign Application Priority Data

July 4, 1974 Japan .................. 49-79189[U]

[52] U.S. Cl. .................. 23/253 A; 204/195 R; 15/302; 15/308; 15/21 D
[51] Int. Cl.² .................. A46B 13/04; G01N 27/26
[58] Field of Search .................. 23/253 A, 253 R; 15/302, 308, 319, 320, 21 D, 21 E; 204/195 R, 195 F, 195 G; 314/23; 324/30 R

[56] References Cited

UNITED STATES PATENTS

| | | | |
|---|---|---|---|
| 2,108,293 | 2/1938 | Perley | 204/195 G |
| 3,043,764 | 7/1962 | Harvey | 324/30 R X |
| 3,216,915 | 11/1965 | Arthur et al. | 324/30 R X |
| 3,421,982 | 1/1969 | Schultz et al. | 324/30 R X |

FOREIGN PATENTS OR APPLICATIONS 1,130,203  5/1962  Germany

OTHER PUBLICATIONS

*Chem. Abstr.*, vol. 57: 9623f (1962).
*Sargent–Welch Scientific Laboratory Instruments Catalog*, p. 425 (1972).

*Primary Examiner*—Robert M. Reese

[57] ABSTRACT

An apparatus for automatically cleaning the electrodes of a pH meter comprising a measuring tank containing a sample solution supplied from a tank of purification section to be subject to measurement of the pH value, a cleaning tank juxtaposed with the measuring tank and having therein a cleaning brush mounted on a rotary shaft, means for supporting the electrodes of the pH meter for vertical movement, and means for supporting the electrodes supporting means for horizontal swinging movement, whereby the electrodes of the pH meter can be moved between the pH value measuring position in the measuring tank and the position engaged by the cleaning brush in the cleaning tank.

1 Claim, 6 Drawing Figures

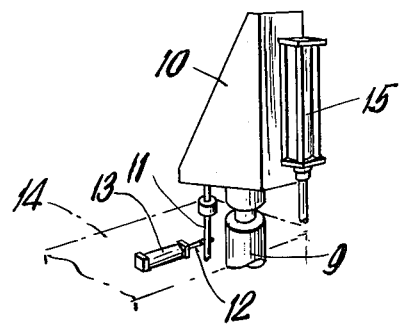
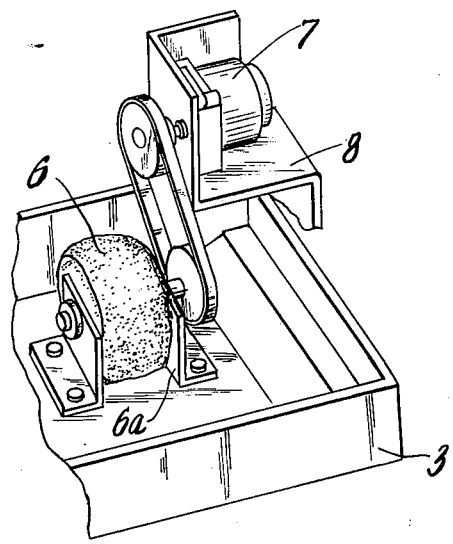
FIG. 2        FIG. 3
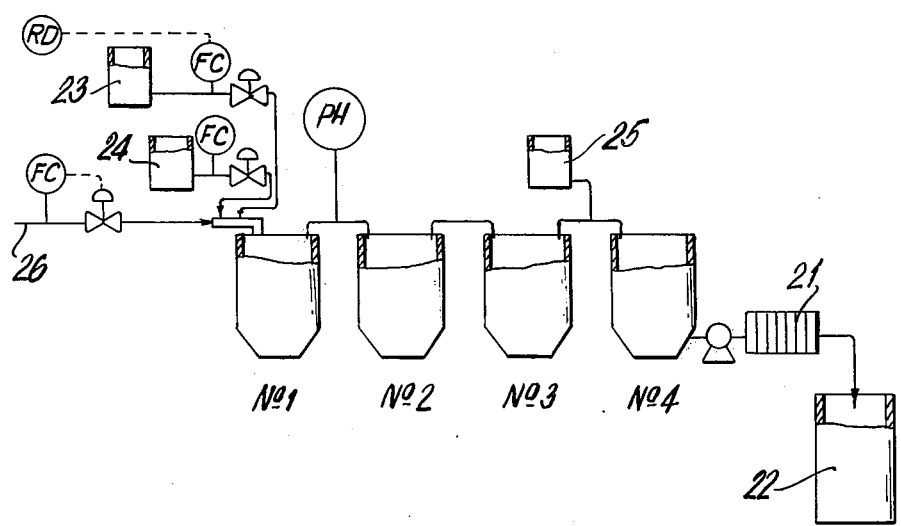
FIG. 4

USING BRUSHING APPARATUS

NOT USING BRUSHING APPARATUS

AUTOMATIC CLEANING APPARATUS FOR ELECTRODES OF pH METER

BACKGROUND OF THE INVENTION

This invention relates to an apparatus for automatically cleaning the electrodes of a pH meter so as to effectively remove scale adhering to the surface of the electrodes of the pH meter.

Purification section for removing impurities in a leaching solution supplied from a leaching section of electritic zinc plant comprises a first, a second and a third stage. Zinc dust is used for removing the impurities such as copper, nickel, cadmium etc. A reagent such as α-nitroso-β-naphthol (the so-called N-N reagent) is commonly used for the removal of cobalt contained in the leaching solution. It is a matter of great importance to properly control the pH value of this solution. It has been common practice to use a test paper for the purpose of this pH control. This manner of pH control has however been defective in that the pH value cannot be accurately measured and discontinuous manual measurement results in an unsatisfactory pH control. Continuous measurement of the pH value by a process pH meter has been proposed in an effort to obviate the defect resulting from the manual measurement of the pH value by the test paper. This proposal has however been also defective in that scale adheres to the glass surface of the glass electrodes of the pH meter in several hours after the commencement of measurement thereby providing a hindrance to the desired accurate and reliable measurement of the pH value.

In order to carry out the desired continuous measurement with such a pH meter, the scale must be effectively removed without adversely affecting the function of the electrodes of the pH meter. However, the scale adhering to the surface of the glass electrodes is in the form of a gummy matter formed by polymerization of α-nitrose-β-naphthol and is generally quite adhesive to such an extent that it can be hardly removed once adhered to the surface of the glass electrodes. While brushing has been found most suitable for the effective removal of such adhesive scale, automatic brushing means suitable for use for the electrodes of the kind above described have not been developed up to the present. This is principally due to the difficulty of assembly of automatic brushing apparatus in the pH meter for the following reasons among others: Firstly, the electrodes of the pH meter are small in size and covered with a thin glass film. Therefore, the electrodes have not a sufficient mechanical strength to withstand the cleaning force. Secondly, careful handling is required since the pH meter is a highly precise and sensitive measuring instrument. Thirdly, the electrodes must be periodically taken out of the pH meter for maintenance.

SUMMARY OF THE INVENTION

It is an object of the present invention to provide a novel and improved apparatus for automatically cleaning the electrodes of a pH meter by effectively removing the scale adhering to the surface of the electrodes.

Another object of the present invention is to provide an automatic cleaning apparatus of the kind above described which removes chemically and physically the scale attaching to the surface of the electrodes of a pH meter.

In accordance with the present invention, there is provided an apparatus for automatically cleaning the surface of the electrodes of a pH meter comprising a measuring tank containing a sample solution supplied from a purification section to be subject to measurement of the pH value, a cleaning tank disposed adjacent to said measuring tank and having therein a cleaning brush mounted on a rotary shaft for rotation therewith, means for supporting said electrodes of said pH meter for vertical movement, and means for supporting said electrode supporting means for horizontal swinging movement, whereby said electrodes of said pH meter can be moved between the pH value measuring position immersed in said measuring tank and the position immersed in said cleaning tank and engaged by said cleaning brush.

BRIEF DESCRIPTION OF THE DRAWINGS

FIG. 2 is a schematic perspective view of means for causing swinging movement of a supporting block shown in FIG. 1.

FIG. 3 is an enlarged schematic perspective view of cleaning means including a cleaning brush shown in FIG. 1.

FIG. 4 is a flow sheet of a purification section in an electrolytic zinc plant to show the position of the pH meter equipped with the automatic electrode cleaning apparatus in the purification section.

DETAILED DESCRIPTION OF THE PREFERRED EMBODIMENT

Figure 1:
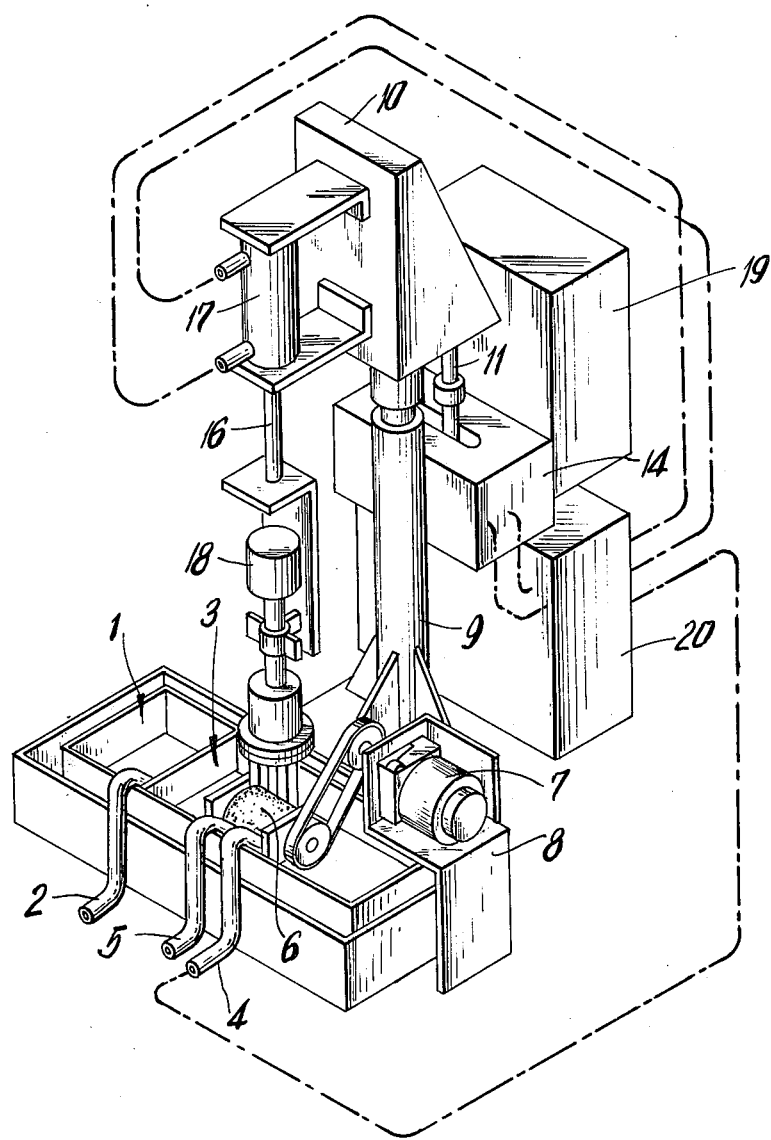
FIG. 1 is a schematic perspective view of an embodiment of the automatic electrode cleaning apparatus according to the present invention.

Referring to FIG. 1, a sample solution is supplied from a purification section of an electrolytic zinc plant system into a measuring tank 1 by a hose 2, and a cleaning tank 3 is disposed in juxtaposed relation with the measuring tank 1. The sample solution supplied to the measuring tank 1 is discharged from the tank 1 by overflowing therefrom or by a suitable discharge means (not shown) disposed in the bottom of the tank 1. A cleaning solution or washing water is supplied by hoses 5 into the cleaning tank 3 and is discharged from the tank 3 by overflowing therefrom or by a suitable discharge means (not shown) disposed in the bottom of the tank 3. Another hose 4 for supplying air under pressure extends into the cleaning tank 3. A cleaning brush 6 is disposed in the cleaning tank 3 and is mounted on a rotary shaft 6a for rotation therewith. A motor 7 is mounted on a frame member 8 and is connected through power transmission means to the rotary shaft 6a to cause rotation of the shaft 6a.

A support 9 is erected adjacent to the array of the measuring tank 1 and cleaning tank 3 to support a rotatable supporting block 10. A connecting rod 11 connects a portion of the lower end of the supporting block 10 to a piston rod 12 of a fluid cylinder such as an air cylinder 13 disposed horizontally in a cylinder box 14 as best shown in FIG. 2. Thus, the supporting block 10 is swingable around the axis of the support 9 in response to the horizontal reciprocating movement of the piston rod 12 of the air cylinder 13. Another fluid cylinder such as an air cylinder 15 is disposed vertically on one side of the supporting block 10 and is suitably fixed to this side of the supporting block 10, and a piston rod 16 extends vertically downward from the air cylinder 17 to support at the lower end thereof an electrode holder 18 which holds the electrodes of a pH meter. A control panel 19 is disposed on the other side of the supporting block 9 and contains therein means for controlling the reciprocating movement of the piston rods 12 and 16 of the respective air cylinders 13 and 15 and means for controlling the swinging movement of the supporting block 10. A pneumatic unit 20 is connected to the control panel 19 to operate in response to the application of a control signal from the control panel 19 so as to supply air under pressure to the air hose 4 and air cylinders 13 and 15.

The air cylinder 15 is actuated to immerse the electrodes of the pH meter in the sample solution contained in the measuring tank 1 when measurement of the pH value of the sample solution in the tank 1 is desired. After a predetermined period of time within which the electrodes are used for the measurement of the pH value of the sample solution in the measuring tank 1, the air cylinder 15 is actuated again to urge the electrodes upward away from the immersed position in the measuring tank 1, and the supporting block 10 is then swung by the air cylinder 13 to bring the electrodes to the position above the cleaning tank 3. The air cylinder 17 is actuated again to immerse the electrodes in the cleaning water contained in the cleaning tank 3, and in this immersed position, the cleaning brush 6 is in cleaning contact with the surface of the electrodes of the pH meter. The air under pressure supplied by the air hose 4 into the washing water contained in the cleaning tank 3 produces bubbles of air in the washing water for cleaning the surface of the electrodes, while at the same time, the surface of the electrodes are subject to brushing by the rotating cleaning brush 6. The cleaning with the air bubbles continues for a period of time of about 15 minutes, and the brushing with the cleaning brush 6 continues for a period of time of about 2 minutes. Upon completion of the cleaning operation, the air cylinder 17 is actuated again to urge the electrodes of the pH meter upward away from the immersed position in the cleaning tank 3, and then the air cylinder 13 is actuated to bring the electrodes to the position above the measuring tank 1, the air cylinder 15 being then actuated to lower the electrodes into the pH value measuring position in the measuring tank 1 again.

The pH meter equipped with the automatic electrode cleaning apparatus of the present invention is disposed in a third stage of purification section of the electrolytic zinc plant as shown in FIG. 4. Referring to FIG. 4, this third stage cobalt-purification section comprises a first, a second, a third and a fourth purification tank, a filter press 21, and a filtrate tank 22. Numeral 23 shows tank for N-N reagent. Numeral 24 shows tank for spent electrolyte. Numeral 25 shows tank for active carbon. Numeral 26 shows pipe connected to a second stage of purification section. In this third stage of purification section, the purified solution from which impurities such as copper, cadmium and nickel have been removed in the first and second stage of purification by addition of zinc dust and another reagent is used as a starting solution, and $\alpha$-nitroso-$\beta$-naphthol or the so-called N-N reagent is added to this starting solution so as to remove cobalt contained in the solution in an amount of 8 to 18 mg/l. Briefly describing this purifying process, the spent electrolyte is added to the starting solution in the tank of the first stage of purification section so that the pH value (about pH:6) of this starting solution can be adjusted to a predetermined value. The N-N reagent is supplied to the tank of the first stage of purification section and reacts with cobalt to form a precipitate which is chemically stable. The pH meter equipped with the automatic electrode cleaning apparatus of the present invention is disposed at the outlet of tank of this first stage of purification section, and the sample solution is continuously supplied by a sampling pump (not shown) to the measuring tank in the apparatus so that the pH value of the sample solution leaving the tank for the first stage of purification section can be continuously measured.

Figure 5:
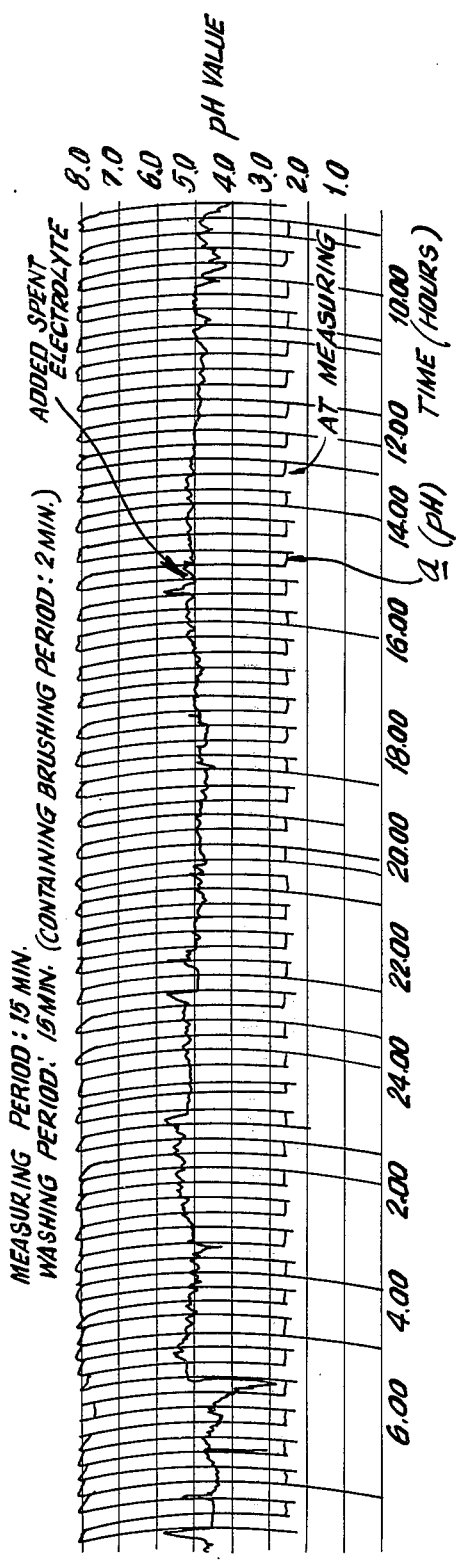
FIG. 5 is a graph showing the results of measurement of the pH value of a leached solution supplied to the purification section of the electrolytic zinc plant by the pH meter equipped with the automatic electrode cleaning apparatus of the present invention.
Figure 6:
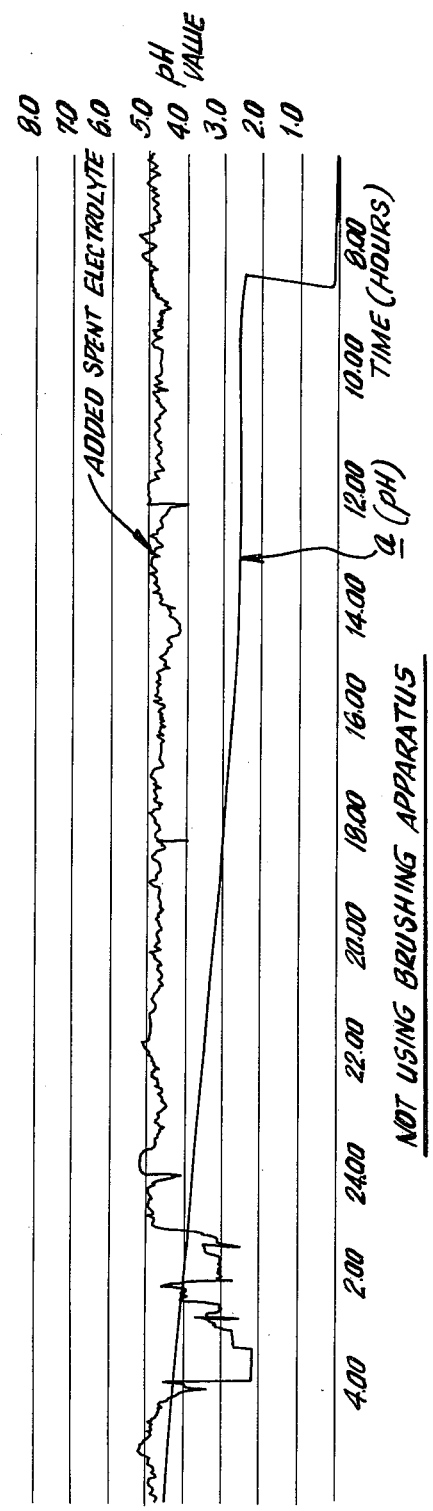
FIG. 6 is a graph similar to FIG. 5 but showing the results of measurement of the pH value without any cleaning on the surface of the electrodes of pH meter.

The results of measurement with the pH meter equipped with the automatic electrode cleaning apparatus of the present invention are shown in FIG. 5 to be compared with similar results shown in FIG. 6 which are obtained without any cleaning on the surface of the electrodes. It will be seen from the graph of FIG. 5 that the waveform $a$ representing the pH value of the sample solution subjected to cobalt-purification by the $\alpha$-nitrose-$\beta$-naphthol is substantially uniform and free from distortion even after measurement over seven days, although it is substantially rectangular due to repeated alternate measurement and cleaning. Thus, continuous measurement over more than one week can be reliably carried out by the use of the automatic electrode cleaning apparatus of the present invention. In contradistinction, in the case of the graph of FIG. 6 in which no cleaning is applied, the pH value $a$ starts to increase progressively with time to such an extent that it increases to about 115% of the starting value in spite of sufficient pH control.

It will be understood from the foregoing description that the pH meter equipped with the automatic electrode cleaning apparatus of the present invention is advantageous in that continuous measurement of the pH value can be reliably carried out over more than one week without the necessity for maintenance, whereas continuous measurement with the prior art pH meter has been limited to a short period of time of the order of several hours. Further, the present invention provides such additional advantages that dirt of the electrodes of the pH meter can be easily observed, and the buffer test (standard solution test) during replacement of the electrodes of the pH meter as well as maintenance of the pH meter can be easily carried out within a short period of time.

What we claim is:

1. An apparatus for automatically cleaning the electrodes of a pH meter comprising a measuring tank containing a sample solution supplied from a solution to be measured, a cleaning tank disposed adjacent to said measuring tank and having therein a cleaning brush mounted on a rotary shaft for rotation therewith, said cleaning brush being in contact with said electrodes, means for supporting said electrodes of said pH meter for vertical movement, and means for supporting said electrode supporting means for horizontal swinging movement, whereby said electrodes of said pH meter are movable between the pH measuring position in said measuring tank and the cleaning position in said cleaning tank.

* * * * *